Aug. 5, 1941.   J. W. HALE   2,251,625
CHANGE SPEED SYSTEM
Filed June 24, 1938   5 Sheets-Sheet 1

INVENTOR
Jesse W. Hale
BY Spear, Rawlings & Spear.
ATTORNEYS.

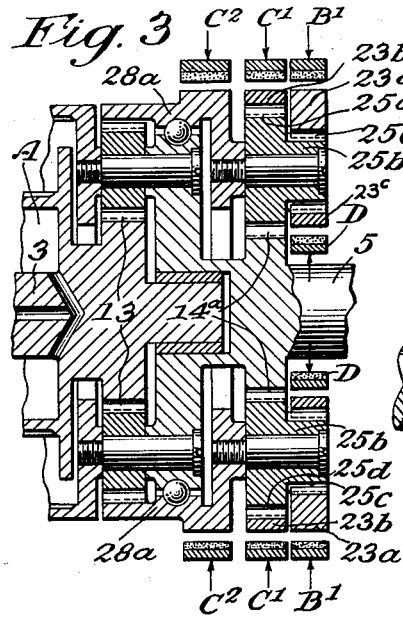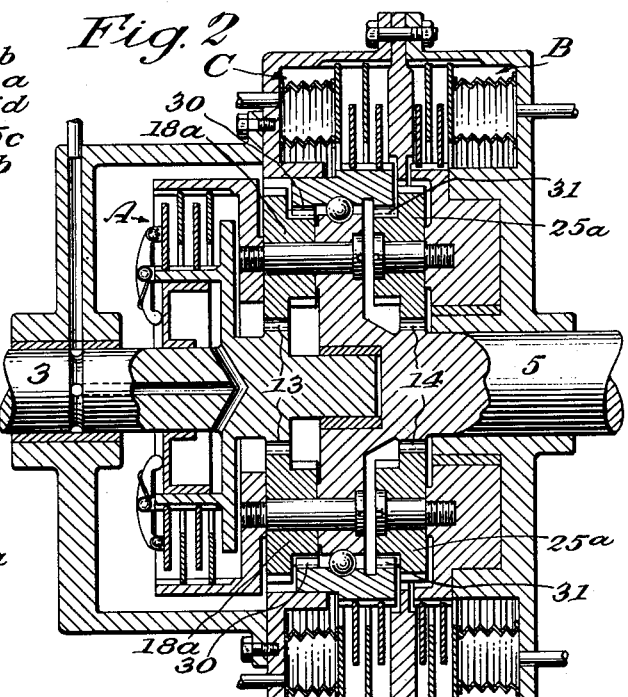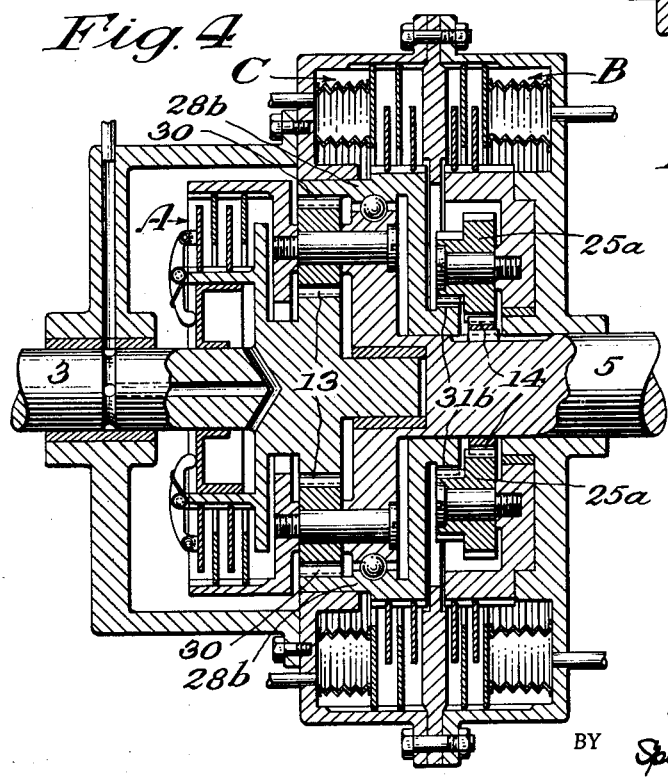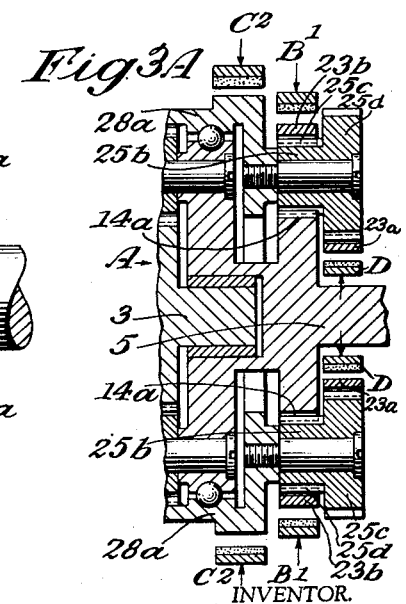

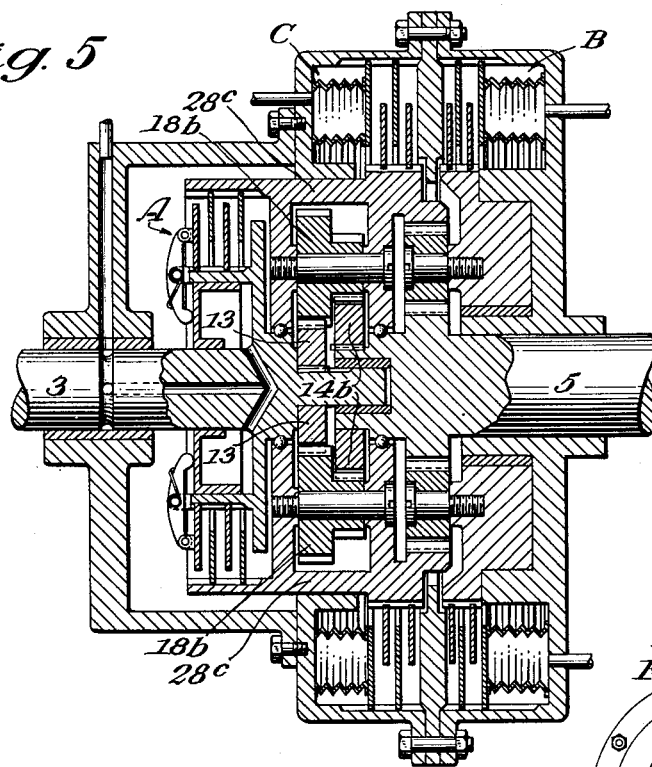
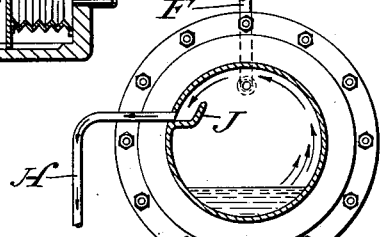
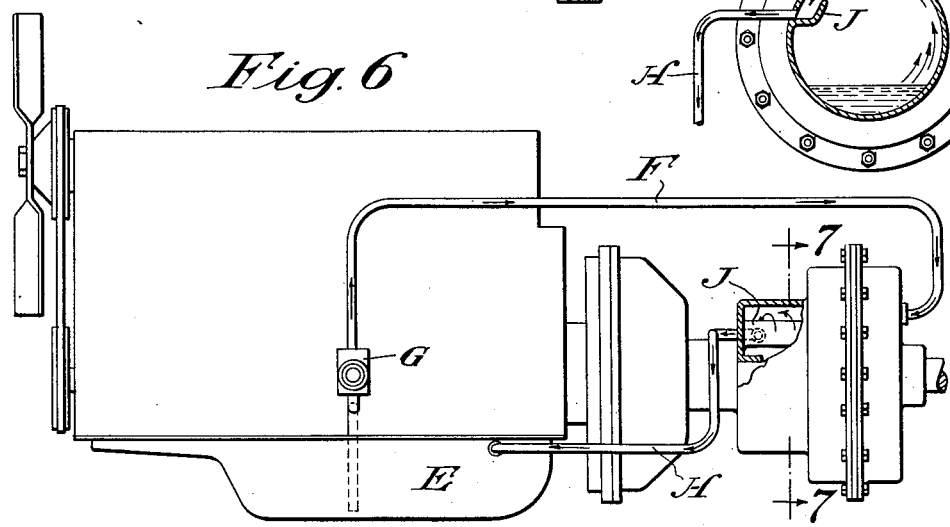

Aug. 5, 1941.  J. W. HALE  2,251,625
CHANGE SPEED SYSTEM
Filed June 24, 1938  5 Sheets-Sheet 4
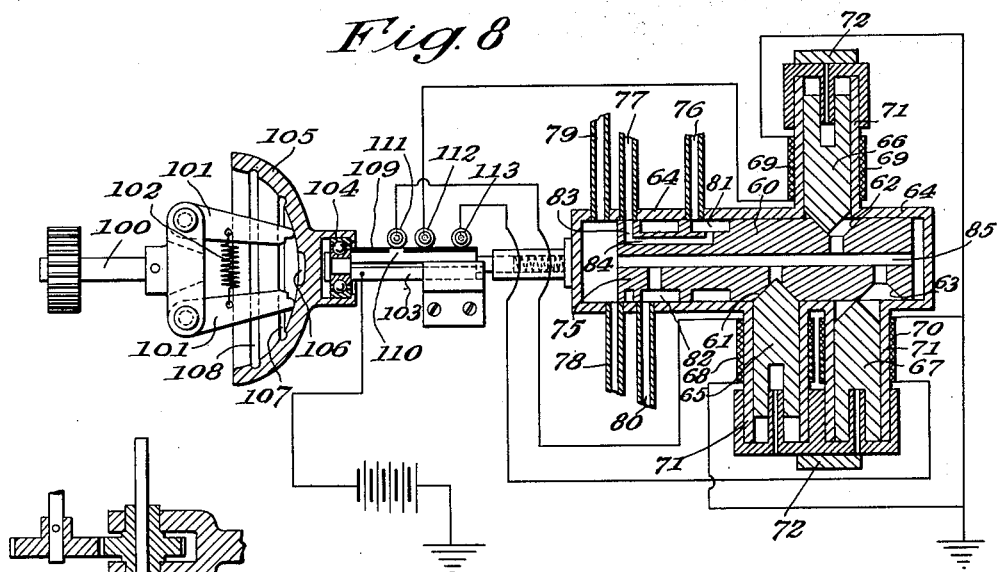
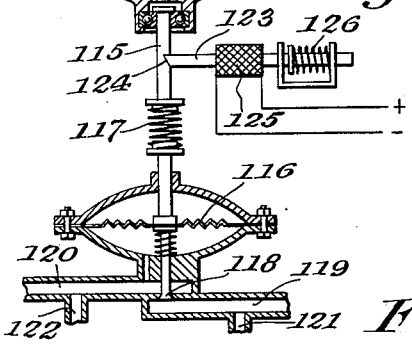
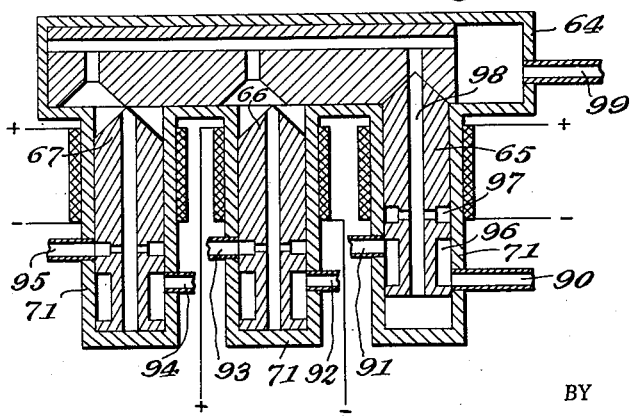
INVENTOR.
Jesse W. Hale
BY Spear, Rawlings & Spear.
ATTORNEYS.

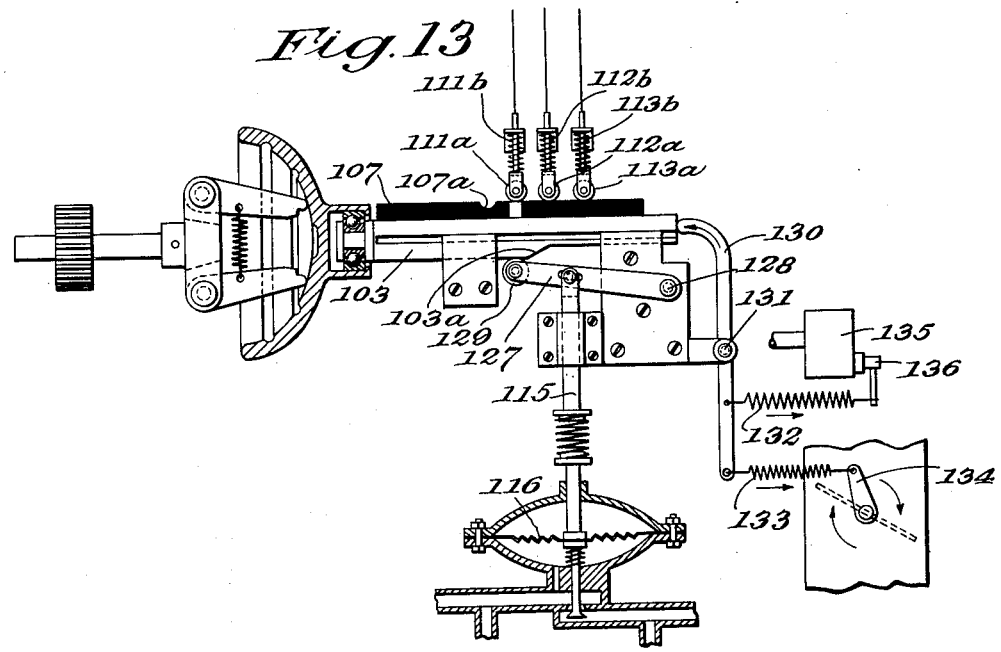
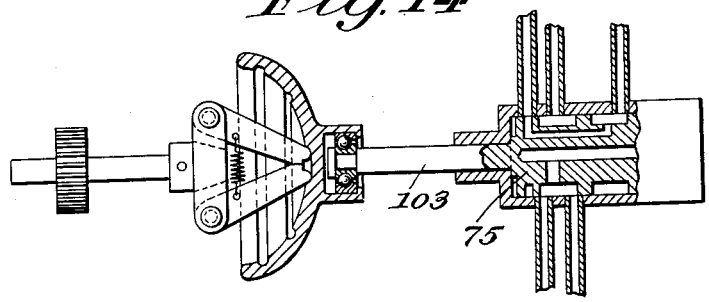

Patented Aug. 5, 1941

2,251,625

UNITED STATES PATENT OFFICE 2,251,625

CHANGE SPEED SYSTEM

Jesse W. Hale, Newton Center, Mass.

Application June 24, 1938, Serial No. 215,657

40 Claims. (Cl. 74—260)

My present invention relates to a novel change speed system.

While many devices have been proposed for use in connecting shafts at different ratios, my present invention has many advantages resulting from its compact and novel construction and efficient operation.

In general, my invention includes a device adapted to connect the shafts at several different ratios. In my device I utilize a pair of normally ineffective couplings between the shafts. Each coupling includes an independently rotatable reaction member with means to prevent its rotation. I also use clutch means to cause the drive shaft and the driven shaft to rotate together to establish a direct drive.

When one of the reaction members is held against rotation, both couplings become effective to establish a suitable drive between the shafts and when the other reaction member is held against rotation, only one coupling is effective and another connection between the shafts is established. The particular ratio established depends on the reaction of the affected members.

In my invention it is essential that only one clutch or brake be engaged at one time and while engagement may be effected in any desired way, I have provided in my invention for their engagement by fluid pressure subject to a control that may be electrically operated and controlled by a centrifugal circuit closer.

My invention also includes other advantages resulting from both its construction and operation which will be apparent from a consideration of the accompanying drawings and specification.

Throughout the specification and drawings like reference numerals are employed to indicate corresponding parts, and in the drawings:

Fig. 1 is a sectional view of my device with a suggested manual control therefor.

Figs. 2, 3, 3ª, 4 and 5 are sectional views of modifications of the device shown in Fig. 1.

Fig. 6 is a view showing a lubricating circuit.

Fig. 7 is a section along the line 7—7, of Fig. 6.

Fig. 8 is a partly sectioned view of one form of automatic valve control.

Fig. 9 shows in section a modified form of valve control.

Fig. 10 is a fragmentary view of a pressure regulating valve.

Figs. 11 and 12 are fragmentary views of different positions of the valve control unit shown in Fig. 8.

Fig. 13 is a view showing a modified form of circuit controlling mechanism, and

Fig. 14 shows the valve operated directly by the governor.

Figure 1:
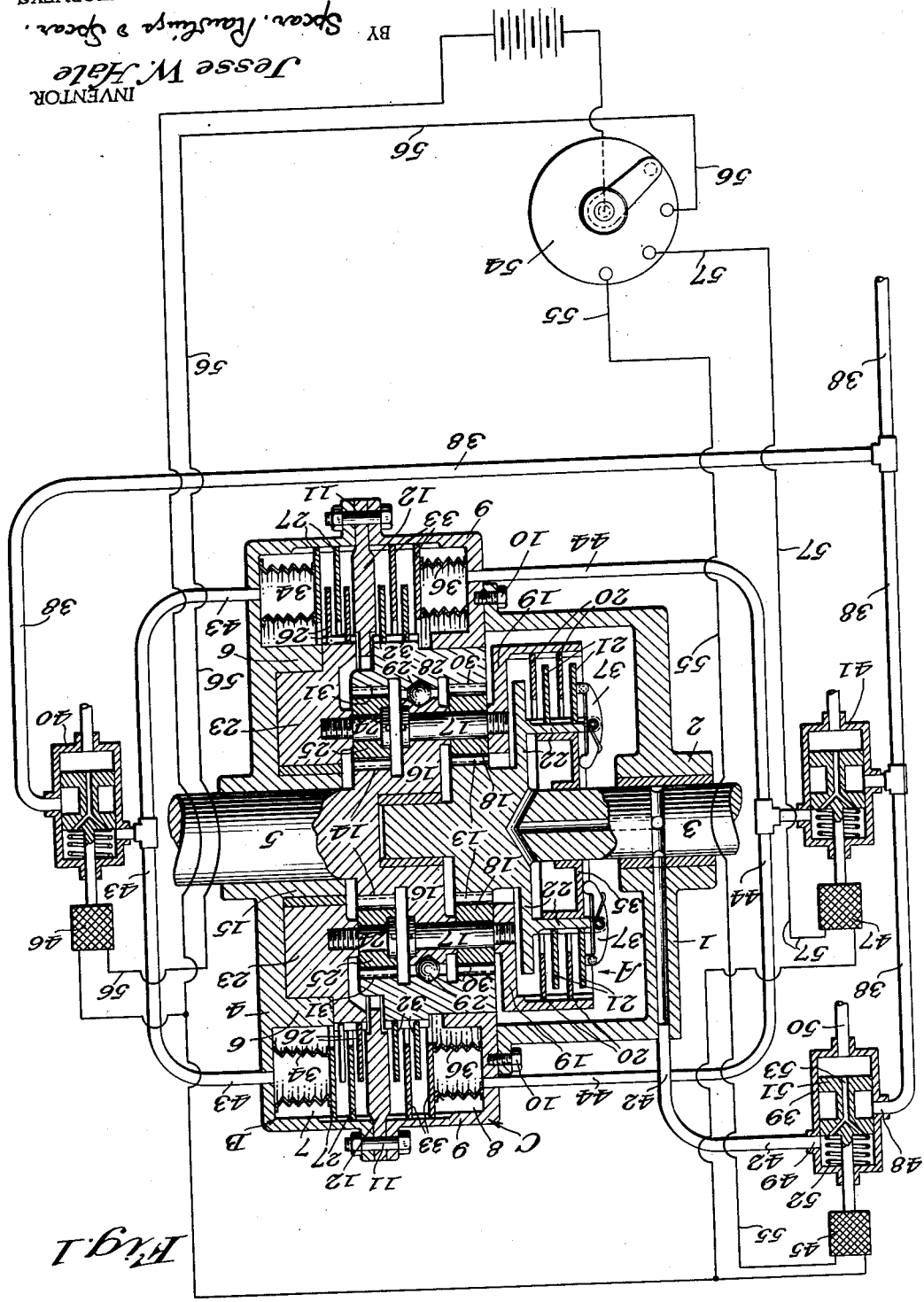

As shown in Fig. 1, the front part 1 of the housing has a hub 2 for the drive shaft 3, and the rear part 4 of the housing has a hub 15 for the driven shaft 5. The housing portion 4 includes an inwardly disposed rim 6 defining an annular compartment or cylinder 7. A similar compartment 8 is formed by the intermediate housing portion 9 connected to the front part 1 by bolts 10, and to the rear part 4 by bolts 11 which also support the backing plate 12.

The drive shaft 3 and the driven shaft 5 include the gears 13 and 14, respectively, and the driven shaft 5 includes a flange 16 which carries shafts 17 on which are mounted idler gears 18 in mesh with the gear 13.

The shafts 17 also support the flanged plate 19 on which are slidably mounted clutch plates 20 for engagement with clutch plates 21 slidably splined on the rim of the drive shaft flange 22. For convenience, the clutch plates 20 and 21 will be hereinafter referred to as the clutch A, the purpose of which is to lock the drive shaft 3 and the driven shaft 5 together to establish a direct drive.

Rotatably mounted on the hub 15 is the rotor or reaction member 23 carrying shafts 24 on which are mounted idler gears 25 in mesh with the driven shaft gear 14. Brake members 26 are slidably splined to the rotor 23 for engagement with the brake members 27 slidably splined to the housing member or portion 4 in the compartment 7. For convenience, the brake members 26 and 27 will be hereinafter referred to as the brake B and serve to hold the rotor 23 against rotation, to establish, as will be explained under the discussion of the operation of my device, a low speed connection between the shafts 3 and 5.

The rotor or reaction member 28 is supported by the driven shaft flanged portion 15 from which it is separated by ball bearings 29. The rotor 28 includes an internally toothed gear portion 30 in mesh with the idler gears 18 to be driven thereby and a similar gear portion 31 to drive the idler gears 25. Brake members 32 are slidably splined on the rotor 28 and are adapted to be engaged by the brake members 33 slidably splined to the housing member 9. For convenience in discussing the operation of my device, the brake members 32 and 33 will be hereinafter referred to as brake C. The brake C locks the rotor 28 to the housing member 9 to effect, as will be subsequently expained, a suitable second speed drive.

From a suitable source of fluid pressure (not shown) a conduit 38 communicates with the valves 39, 40 and 41. The valves 39, 40 and 41 are connected to the pressure operable members 35, 34 and 36, for the clutch and brakes A, B and C, respectively, by conduits 42, 43 and 44, respectively. The valves 39, 40 and 41 are operated by solenoids 45, 46 and 47, respectively.

The valves 39, 40 and 41 are identical and the reference numerals employed to indicate the valve generally is specifically utilized to indicate the valve casings. The valve casings have spaced inlet and outlet ports 48 and 49 and drains to return fluid to its source. Within the casings are slide valves 51 normally held in closed position by the springs 52 but opened against the spring pressure by the solenoids when energized. The valves 51 are bored as at 53 to permit the pressure in the pressure operable members to be relieved when the valves are closed.

At 54 I have shown a switch adapted to close the circuits 55, 56 and 57 to the solenoids 45, 46 and 47, respectively, in desired order. While manual control of the change speed device is desirable under certain conditions and in certain uses, automatic operation is preferable.

While the clutch A, and brakes B and C may be operated in any way desired and be of any construction, the use of fluid pressure operable means is preferred. Such means may be expansible members, such as indicated at 34 and 36 as in control of the brakes B and C, of any suitable material, such as artificial rubber, which is not affected by oil. The clutch and brakes may likewise be operated by a piston such, for example, as the piston 35 concentric with the drive shaft 3 adapted to actuate the levers 37 pivotally mounted on the rim 22 in control of the clutch A.

In Figs. 2, 3, 3ª, 4 and 5, I have shown modifications of my device. Where it is desired to provide gear ratios not possible with the device shown in Fig. 1, step gears may be substituted for either or both of the sets of idler gears 18 or 25.

As shown in Fig. 2, the step gears 18ª are in mesh with the gear 13 and the rim gear 30 and the step gears 25ª in mesh with the rim gear 31 and the gear 14 on the shaft 5. As the structure utilized differs in no other detail from that shown in Fig. 1, it is therefore not described further.

In Figs. 3 and 3ª I have shown a modification of my invention in which several gear ratios between the shafts 3 and 5 may be established. In this form of my invention the rotor 28ª carries the step gear 25ᵇ which may include as many steps as are desired. In Figs. 3 and 3ª the step gear 25ᵇ includes the steps or gear portions 25ᶜ, and 25ᵈ. Independently rotatable reaction members 23ª and 23ᵇ are provided for each of the portions 25ᶜ and 25ᵈ. At B¹, C¹ and C² I have indicated brakes for the reaction members 28ª, 23ª and 23ᵇ, respectively. While these may be of any desired type, I have indicated for convenience, brakes of the band type.

The difference between Figs 3 and 3ª is in the position of the step gears 25ᵇ. In Fig. 3ª the smaller step or portion 25ᶜ is in mesh with the gear 14ª on the driven shaft while the larger portion 25ᵈ is in mesh with the externally toothed reaction member 23ᶜ controlled by the brake D.

If the reaction member 23ᶜ is in control of the larger portion 25ᶜ as shown in Fig. 3ª, a reverse drive is provided. If the reaction member 23ᶜ is in control of the smaller portion 25ᶜ and the larger portion 25ᵈ is in mesh with the driven gear 14, an extremely low gear connection between the shafts is established as shown in Fig. 3.

The order of operation of the clutch and brakes in the device shown in Fig. 3 is D, B¹, C¹, C² and A. In Fig. 3ª, the order of brake and clutch operations is B¹, C² and A with actuation of the brake D establishing a reverse drive. In both of the forms of my invention shown in Figs. 3 and 3ª, the clutch A is also utilized to lock the shafts 3 and 5 together.

In Fig. 4 the step idler gears 25ª are substituted for the idler gears 25. The rotor 28ᵇ is supported by the driven shaft 5 and includes an externally toothed gear portion 31ᵇ in mesh with the step gear 25ª which is in mesh with the driven shaft gear 14. In the device shown in Fig. 4, the lowest ratio is established when the rotor 28ᵇ is held against rotation. The brake B is the low speed brake and the second speed is effected when the brake C is actuated.

In the modification of my invention shown in Fig. 5, the independently rotatable reaction member 28ᶜ is supported by the shafts 3 and 5 and carries the step idler gears 18ᵇ in mesh with the gear 13 and the gear 14ᵇ on the shaft 5. The clutch A locks the housing or reaction member 28ᶜ to the drive shaft 3.

In Figs. 6 and 7 I have shown the lubrication circuit employed. While any source may be utilized, I have shown in Fig. 6 the crank case E as the source of the lubricant delivered to my device through the conduit F by the conventional pump G and returned to the crank case E by the conduit H. It will be appreciated that an excess of oil in my device must be avoided and for that reason I position in the upper part of my device a longitudinally extending gutter J which collects the oil thrown upwardly by the revolving parts. Thus the oil is raised sufficiently to ensure its return to the crank case E by gravity.

*Operation of the device*

Before describing the automatic control of my change speed device, a discussion of its operation is in order and for this purpose I refer to Fig. 1.

Assuming that the brake B is not engaged and the prime mover (not shown) is running, the drive shaft 3 and the gear 13 rotate in a clockwise direction. Because of the load on the driven shaft 5, the gears 18 rotate counterclockwise on their shafts with the result that the rotor 28 is rotated also in a counterclockwise direction. Because of the load on the driven shaft 3, the gears 25 planetate around the shaft 3 causing a counterclockwise rotation of the rotor 23.

Assuming now that the switch 54 is positioned to close the circuit 56 to the solenoid 46 to open the valve 40, fluid pressure is now available to actuate the expansible member 34 to effect an engagement of the brake B holding the rotor 23 against rotation. When the rotor 23 is thus locked against rotation, rotation of the rotor 28 is effective to rotate the idler gears 25 on their shafts to effect a clockwise rotation of the driven shaft 5. Since rotation of the driven shaft 5 results in planetation of the idler gears 18 when the brake B is engaged, the driven shaft 5 is rotated at a rate of speed satisfactory for a low speed drive.

Movement of the switch 54 to close the circuit 57 to the solenoid 47 results in the closing of the valve 40 in control of the brake B and the relieving of the pressure in its pressure operable member 34 and the opening of the valve 41 in control of the pressure operable member 36 in control of the brake C. With the brake C engaged, the rotor 28 is held against rotation with the result that rotation of the drive shaft 3 will cause the clockwise planetation of the idler gears 18 with a corresponding rotation of the driven shaft 5 suitable for a satisfactory second speed.

Movement of the switch 54 to close the circuit 55 to the solenoid 45 results in the closing of the valve 41 in control of the brake C and the relieving of the pressure in its pressure operable member 36 and the opening of the valve 39 in control of the pressure operable member 35 in control of the clutch. Fluid pressure causes the actuation of the levers 37 to close the clutch A, locking the drive shaft 3 and the driven shaft 5 together in direct drive.

The operation of the devices shown in Figs. 2 and 4 will be obvious from the above with the exception previously noted that in Fig. 4, the brake B is the low speed brake and the brake C is the second speed brake.

The operation of the device shown in Figs. 3 and 3a is essentially similar except that the number of gear ratios possible is increased and the step gears are carried by the reaction member 28a.

While I have discussed my device with reference to the use of the shaft 3 as the drive shaft, the shaft 5 of any of the embodiments of my invention may be used for this purpose, as when used with a low speed prime mover, and a higher driven shaft speed is desired.

With the shaft 5 the drive shaft, connection of the shafts 3 and 5 by the clutch A affords the lowest ratio. When brake C is engaged and the rotor 28 is held against rotation, the rotor 23 rotates in the same direction as the shaft 5. The idler gears 18 planetate in the same direction as the shaft 5 and cause the shaft 3 to rotate in the same direction, but faster than the shaft 5, due to the ratio of the gears 18 and 30.

When the brake B is engaged, the rotor 28 is released and the rotor 23 held against rotation. The gears 25 are now effective to rotate the rotor 28 in reverse direction relative to the shaft 5, increasing the speed of the gears 18 and consequently the speed of the shaft 3.

It will thus be appreciated that the reaction members may be coupled, through the gearing above described, either to the shaft 3 or the shaft 5 regardless of which of the shafts is the driving member.

*Controls for the clutch and brakes*

From a consideration of the operation of my device, it will be appreciated that it is essential that the clutch and brakes be actuated in predetermined order and that when either of the brakes or the clutch is engaged the others be disengaged.

In Fig. 1 I have shown the use of solenoid operated valves 39, 40 and 41 automatically controlled by the springs 52 when the circuits are open. The circuits 55, 56 and 57 are manually controlled, and while it will be appreciated that for certain uses of change speed devices a manual control is desirable, in general an automatic control subject to sufficient operator control to render its automatic operation flexible, is preferable.

In such an automatic control, as governor responsive to the speed of either the drive shaft 3 or the driven shaft 5 is utilized. When, however, a centrifugally operated circuit closer is used, means must be employed to retain the solenoid actuated member in desired position after its circuit is broken and before a circuit to another solenoid is completed. Furthermore, it is necessary to avoid establishing an excessive load on the battery.

I effect this result by the use of a member 60 of low residual magnetism having spaced notches 61, 62 and 63 and slidably mounted in a casing 64. The member 60 is used to retain solenoid actuated wedge members 65, 66 and 67 in desired position, as will be hereinafter explained. The sliding of the member 60 may be used to control a valve in control of the fluid system, as shown in Fig. 8 or its utility may be confined to the holding of solenoid operated valves as shown in Fig. 9 in desired position intermediate the closing of the circuits to the various solenoids. The solenoids for the members 65, 66 and 67, are indicated at 68, 69 and 70, respectively.

The members 65, 66 and 67 are wedge shaped and are each mounted in casing 71 disposed on the casing 64 so that when actuated by the solenoids, each of the wedge members is effective to move the member 60 a predetermined distance in a predetermined direction.

As shown in Fig. 8, the member 65 is in the notch 61 while the member 66 is positioned relative to the notch 62 so that when actuated by its solenoid 69, the member 60 will be moved to the left, as viewed in Fig. 8, while the member 67 is locked out of a position in which, if actuated, it would enter the notch 63.

When the solenoid 69 is actuated, the member 66 forces the member 60 to the left. The members 65 and 67 are then positioned as shown in Fig. 11 in a position wherein either may become effective to move the member 60.

In the position shown in Fig. 12, the solenoid 70 has been actuated and the wedge member 67 has moved the member 60 further to the left as viewed in the drawings. The wedge member 66 is in a position to be actuated to move the member 60 to the right while the member 65 is in an inoperative position since it is out of alignment with the notch 61 until the solenoid 69 causes the wedge member 66 to move the member 60.

While the wedge members 65, 66 and 67 are actuated by their solenoids, means must be provided to disengage the wedge members from their notches to permit desired movements of the member 60. As the wedge members must be retained in position intermediate the completion of the circuits, no two of which may be completed at the same time, I utilize permanent magnets as the wedge members 65, 66 and 67 disposed to normally be attracted to the member 60. The members 65, 66 and 67 are interconnected by the shroud 72 of magnetic metal.

Therefore, when no solenoid is actuated, the members 65, 66 and 67 are retained in position by their magnetism. When a solenoid is actuated, however, for example the solenoid 69 of Fig. 8, the polarity of the members 65, 66 and 67 is reversed, so that the members 65 and 67 will be repelled by the magnetic flux through the member 60 being of like polarity permitting the wedge member 66, actuated by the solenoid 69, to move the member 60 to the left. When the solenoid 69 is no longer energized, the members 65, 66 and 67 are again retained in desired position by their magnetism.

In Fig. 8, the member 60 includes a valve portion 75 and the casing 64 includes an inlet 76 from the pressure supply and outlet 77 in communication with the means operating the brake B and the outlet 78 in communication with the means operating the brake C and outlet 79 in communication with the means operating the clutch A. At 80 I have shown a casing outlet in communication with the source of pressure supply.

The portion 75 is formed with annular recesses 81, 82 and 83 with the recesses 81 and 83 being interconnected by a conduit 84 by which the conduits 77, 78 and 79 are successively connected to the inlet 76. The member 60 is longitudinally bored as at 85 and this bore is connected with the recess 82 and to each of the notches 61, 62 and 63 to ensure adequate lubrication and to prevent the building up of pressures. The members 65, 66 and 67 may also be grooved to equalize the pressures.

Before considering the control of the circuits, a description of the valves shown in Fig. 9 will be convenient. In Fig. 9 each of the casings 71 includes an inlet port and an outlet port. The casing 71 for the member 65 includes inlet port 90 and an outlet port 91 in communication with the pressure operable member 34 for the operation of the brake B. The casing 71 for the member 66 includes an inlet port 92 and an outlet port 93 in communication with the pressure operable member 36 for effecting engagement for the brake C, and the casing 71 for the member 67 includes an inlet port 94 and an outlet port 95 in communication with the pressure operable member 35 for operating the clutch A.

Each of the members 65, 66 and 67 includes annular recesses 96 and 97. The recesses 96 are adapted to interconnect the inlet and outlet ports while the recesses 97 are in communication with the longitudinal bore 98 to permit pressure to be relieved when the inlet and outlet ports are disconnected. In Fig. 9 the casing 64 has a return conduit 99 to the source.

In accordance with my invention, I utilize centrifugally operated mechanism to effect the automatic operation of the controls. In Fig. 8 I have shown a centrifugally operated circuit closer which may be driven so as to represent the engine speed or the motor vehicle speed. In Fig. 10, I have shown an additional centrifugally operated member for use, as will subsequently be described, in controlling the engagement of the brake B.

In Fig. 8 I have shown a governor comprising a shaft 100 on the head of which are pivotally mounted the weighted arms 101 under the influence of a spring 102. At 103 I have indicated a slidable rod connected as at 104 to the rotatable cup shaped member 105 so that the rod 103, while slidable with the member 105, is not rotated therewith. The member 105 is arcuate with its center intermediate the arms 101 and forwardly of their pivotal connection with the shaft 100 so that the action of the arms 101 is varied to render the centrifugal force effective nearly in direct proportion to the speed of rotation instead of the square of the speed.

This results since the angular movement of the governor arms 101 is more effective to cause a sliding movement at lower speeds and becomes increasingly less effective as the speed increases and the arms 101 reach their outer position where their resulting angular action is at a minimum. It will be obvious, therefore, that the member 105 does not need to be arcuate as it may consist of sections angularly disposed to each other for the same purpose.

In Fig. 8 I have shown the member 105 as being recessed at 106, 107 and 108 to act as detents for the arms 101. The rod 103 is insulated as at 109 and includes a contact 110. Roller contacts 111, 112 and 113 for the solenoids 68, 69 and 70 respectively are adapted to be successively contacted thereby as the rod 103 is actuated by the governor.

When the governor arms are positioned in the recess 106 as when the speed of the governor is below a predetermined speed, no contact is closed. Because of the nature of my valve control, the member 68 remains in an operative position so that the brake B is actuated to establish a low speed drive until the contact 110 is moved to complete the circuit to the solenoid 69 through the contact 112. It will be appreciated that one of the advantages of my invention is that excessive current consumption is avoided since the contact 111 for the solenoid 68 in control of the member 65 is energized only for the purpose of causing the release of the brake C and causing the engagement of the brake B. Reactuation of the solenoid 68 is not necessary until the circuit to the solenoid 69 has been closed.

As the speed of the governor driving mechanism increases, the rod 103 is moved from the position shown in Fig. 8 to successively close the circuits to the solenoids 69 and 70.

In Fig. 10 I have shown a governor similar to that described in connection with Fig. 8. In Fig. 10, the governor is to be driven so as to be responsive to the engine speed and through the rod 115, connected to the diaphragm or like pressure responsive element 116 by the spring 117 actuates the pressure regulating valve 118 connecting the conduits 119 and 120. For purposes of illustration, it may be assumed that the conduit 119 is connected to the inlets 92 and 93 of the device shown in Fig. 9 by the conduit 121 and that the conduit 120 is in communication with the conduit 90. Pressures in the conduit 120 are relieved through the bleeder conduit 122 which either returns the lubricant directly to its source or indirectly after being utilized as lubrication.

By this device, fluid pressure is effective to actuate the brake B in direct relation to the engine speed for, as the engine speed exceeds a predetermined speed, the pressure regulating valve 118 is positioned to admit a corresponding brake actuating pressure. Although the regulating valve 118 is closed during idling speeds, I have shown means for rendering the device inoperative. The catch 123 is adapted to be forced into the recess 124 in the rod 115 by the solenoid 125 to prevent movement of the rod 115 by the governor. When the circuit is opened, the catch 123 is under the influence of the spring 126.

In Fig. 13, I have shown a compact device in which the circuits may be automatically controlled while permitting the flexibility essential for motor vehicular use. In the device shown in Fig. 13, the rod 103 carries a cam portion 103a while the insulation 107 is formed with a recess 107a. The contacts 111a, 112a and 113a are under the control of springs 111b, 112b and 113b so that a detent action is provided. The springs 111b, 112b and 113b are progressively stronger.

The rod 115 in control of the pressure regulating valve 116 is actuated by a lever 127 pivoted as at 128 and includes a roller adapted to travel over the cam surface 103ª.

With the engine idling, the circuit is closed to the solenoid 65 (Figs. 8 and 9) but the pressure regulating valve 116 is closed. On an increase in engine speed, the pressure regulating valve 116 is opened effecting an engagement of the brake B.

Action of the governor is opposed by the lever 130 pivotally supported as at 131 and under the influence of springs 132 and 133. The spring 133 is adapted to be varied by the operator during his control of the acceleration of the vehicle. I have shown the spring 133 as connected to the throttle valve 134 to accomplish this result.

The tension of the spring 132 is adapted to be varied during deceleration and to accomplish the result I have shown the cylinder 135 representative of a brake actuating source of power (either vacuum or pressure) and a piston to be actuated thereby. The spring 132 is connected to the exposed portion 136 of the piston.

Thus on acceleration or deceleration, the action of the governor is varied by varying the opposition to the movement of the rod 103 so that the desired flexibility is ensured. The use of such means ensuring flexibility of operation is limited to the device shown in Fig. 13 only for the purpose of simplifying the drawings.

In Fig. 14 I have shown the use of the governor to actuate the valve directly. This may be readily accomplished by connecting the rod 103 directly to the valve 75.

In accordance with my invention, a compact and efficient change speed device is provided which is adapted to be manually, automatically or semi-automatically controlled to provide a change speed system adaptable to the many different types of service where the use of such devices is desirable.

What I therefore claim and desire to secure by Letters Patent is:

1. In a change speed device, a pair of shafts, a gear on each of said shafts, idler gears carried by one of said shafts in mesh with said gear on said other shaft to establish a normally ineffective coupling between said shafts, a second normally ineffective coupling between said idler gears and said gear on said shaft carrying said idler gears, means to render both of said couplings simultaneously effective, means to render said first-named coupling effective and means to rotate said shafts together.

2. In a change speed device, a drive shaft, a driven shaft, a gear on each of said shafts, idler gears carried by said driven shaft in mesh with said drive shaft gear to establish a normally ineffective shaft coupling, means adapted to render said coupling variably effective to planetate said idler gears in the direction of drive shaft rotation, said means comprising a pair of reaction members rotatable independently of said shafts and means to hold each of said reaction members against rotation to establish different ratios between said shafts.

3. In a change speed device, a drive shaft, a driven shaft, a gear on each of said shafts, idler gears carried by said driven shaft in mesh with said drive shaft gear to establish a normally ineffective coupling between said idler gears and said driven shaft gear, said second-named coupling comprising a pair of reaction members rotatable independently of said shafts, idler gears carried by one of said reaction members in mesh with said driven shaft gear, the other of said reaction members including a gear portion in mesh with said first-named idler gears and a gear portion in mesh with said last-named idler gears, brake means to hold said first reaction member against rotation to render both of said couplings simultaneously effective, brake means to hold said second reaction member against rotation to render said first coupling effective, and clutch means to lock said shafts together.

4. The device as claimed in claim 2 in which the idler gears carried by the driven shaft are step gears.

5. The device as claimed in claim 2 in which the idler gears carried by one of said reaction members are step gears.

6. In a change speed device, a pair of shafts, a gear on each of said shafts, idler gears carried by one of said shafts in mesh with said gear on said other shaft to establish a normally ineffective coupling between said shafts, a second normally ineffective coupling between said idler gears and said gear on said shaft carrying said idler gears, brake means to render both of said couplings simultaneously effective, brake means to render said first-named coupling effective, clutch means to rotate said shafts together, and means to actuate said clutch and brake means, said actuating means including a control to effect the actuation of said clutch and brake means in predetermined order with the actuation of any one of said clutch and brake means being accompanied by the disengagement of the other clutch and brake means.

7. In a change speed device, a pair of shafts, a gear on each of said shafts, idler gears carried by one of said shafts in mesh with said gear on said other shaft to establish a normally ineffective coupling between said shafts, a second normally ineffective coupling between said idler gears and said gear on said shaft carrying said idler gears, brake means to render both of said couplings simultaneously effective, brake means to render said first-named coupling effective, clutch means to rotate said shafts together, means to actuate said clutch and brake means, said actuating means including a control to effect the actuation of said clutch and brake means in predetermined order with the actuation of any one of said clutch and brake means being accompanied by the disengagement of the other clutch and brake means, and speed responsive means to actuate said control.

8. In a change speed device, a pair of shafts, a gear on each of said shafts, idler gears carried by one of said shafts in mesh with said gear on said other shaft to establish a normally ineffective coupling between said shafts, a second normally ineffective coupling between said idler gears and said gear on said shaft carrying said idler gears, brake means to render both of said couplings simultaneously effective, brake means to render said first-named coupling effective, clutch means to rotate said shafts together, means to actuate said clutch and brake means, said actuating means including a control to effect the actuation of said clutch and brake means in predetermined order with the actuation of any one of said clutch and brake means being accompanied by the disengagement of the other clutch and brake means, speed responsive means to actuate said control and operator controlled means for varying the action of said speed responsive means.

9. In a change speed device, a pair of shafts, a gear on each of said shafts, idler gears carried by one of said shafts in mesh with said gear on said other shaft to establish a normally ineffective coupling between said shafts, a second normally ineffective coupling between said idler gears and said gear on said shaft carrying said idler gears, brake means to render both of said couplings simultaneously effective, brake means to render said first-named coupling effective, clutch means to rotate said shafts together, means to actuate said clutch and brake means, said actuating means including a control to effect the actuation of said clutch and brake means in predetermined order with the actuation of any one of said clutch and brake means being accompanied by the disengagement of the other clutch and brake means, speed responsive means to actuate said control and operator controlled means for varying the action of said speed responsive means, said operator controlled means including a source of power rendered effective during deceleration.

10. In a change speed device for a motor vehicle having a brake system having a braking actuating source of power, a drive shaft, a driven shaft, means to connect said shafts at different ratios, speed responsive means to actuate said shaft connecting means, and operator controlled means for varying the action of said speed responsive means, said operator controlled means including means operable by said source of power coincidentally to the operation of said braking system.

11. A drive member, a driven member, means to vary the ratio between said members including a pressure operated member to effect said ratio varying means, a source of fluid under pressure, means including a pressure regulating valve to deliver fluid under pressure to said pressure operable member and means responsive to engine speed to actuate said valve to vary the pressure of delivered fluid in proportion to engine speed.

12. In a change speed device for use with a prime mover, a drive shaft, a driven shaft, and means adapted to connect said shafts at different ratios, said means including an independently rotatable member normally rendering said connecting means ineffective, a brake to hold said rotatable member against rotation to render said means effective, fluid pressure operable means to actuate said brake, a source of pressure in communication with said pressure operable means, a pressure regulating valve in control of said source, and means responsive to the speed of said prime mover to actuate said pressure regulating valve.

13. In a change speed device for use with a prime mover, a drive shaft, a driven shaft, means adapted to connect said shafts at different ratios said means including an independently rotatable member normally rendering said connecting means ineffective, a brake to hold said rotatable member against rotation to render said means effective, fluid pressure operable means to actuate said brake, a source of pressure in communication with said pressure operable means, a pressure regulating valve in control of said source, means responsive to the speed of said prime mover to actuate said pressure regulating valve and manually controlled means to render said speed responsive means inoperative.

14. A drive member, a driven member, electrically operated means to vary the ratio between said drive and driven members, said electrically operated means including a stationary contact, a slidable contactor including an internally cam shaped surface, and thrust or members to coact with said cam shaped surface at a varying angularity dependent upon position of said slidable contactor.

15. In a change speed device, a drive member, a driven member, means to vary the ratio between said member, said means including engaging means, pressure operated means to operate said engaging means, electromagnetic means to operate said pressure operated means, permanent magnetic means to stabilize said pressure operated means, and electromagnetic means to oppose said permanent magnetic means to release said engaging means.

16. In a change speed device, a drive member, a driven member, means to vary the ratio between said members, said means including engaging means, pressure operated means to operate said engaging means, a control to operate said pressure operated means, said control comprising electromagnetic means to actuate said control, permanent magnetic means to stabilize said control, and electromagnetic means to oppose said permanent magnetic means to release said engaging means, speed responsive means to close said circuits to both of said electromagnetic means in desired order, and operator controlled means to vary the action of said speed responsive means.

17. In a change speed device, a drive member, a driven member, means to vary the ratio between said members, said means including engaging member, pressure operated means to operate said engaging means, a control to operate said pressure operated means, said control comprising electromagnetic means to actuate said control, permanent magnetic means to stabilize said control, and electromagnetic means to oppose said permanent magnetic means to release said engaging means, speed responsive means to close said circuits to both of said electromagnetic means in desired order, and operator controlled means to vary the action of said speed responsive means, said operator controlled means including a source of power available in deceleration.

18. In a change speed device, a drive shaft, a driven shaft, means including a plurality of control members adapted when any one of said members is separately engaged to connect said shafts at different ratios and means to actuate said members in predetermined order, said means including a plurality of members, a solenoid to actuate each of said members, a circuit to each of said solenoids, speed responsive means to close each of said circuits at predetermined speeds so that only one of said circuits is closed at any one time and means to maintain a solenoid actuated member in actuated position after its circuit has been opened and until another of said circuits has been closed.

19. In a control for a source of power comprising a movable member having a plurality of recesses, a plurality of solenoids, and a plurality of wedge members adapted to be actuated by said solenoids, said wedge members being disposed relative to said recesses so that each wedge member is adapted to impart a predetermined movement to said movable member when actuated by its solenoid, said predetermined movement being effective to cause said movable member to block effective movement of one of said wedge members and to render another of said wedge members operable when actuated to move said movable member.

20. In a change speed device, a pair of shafts, a gear on each of said shafts, idler gears carried by one of said shafts in mesh with said gear on said other shaft to establish a normally ineffective coupling between said shafts, a second normally ineffective coupling between said idler gears and said gear on said shaft carrying said idler gears, brake means to render both of said couplings simultaneously effective, brake means to render said first-named coupling effective, clutch means to rotate said shafts together, means to actuate said clutch and brake means comprising a source of pressure, pressure operable members, means to separately effect communication between said source and each of said pressure operable members, an electric control comprising a plurality of members, a solenoid to actuate each of said members, means to separately energize said solenoids and means to maintain an actuated member in actuated position when its solenoid is no longer energized and until another solenoid is energized.

21. In a control for a source of power comprising a movable member having a plurality of recesses, a plurality of solenoids, and a plurality of magnets having wedge shaped portions adapted to be actuated by said solenoids and normally being attracted to said movable member, said magnets being disposed relative to said recesses so that each magnet is adapted to impart a predetermined movement to said movable member when actuated by its solenoid, said predetermined movement being effective to cause said movable member to block effective movement of one of said magnets and to render another of said magnets operable when actuated by its solenoid to move said movable member and means interconnecting said magnets so that when any one of said solenoids is actuated, the polarity of said magnets is reversed, whereby said movable member is repellant to said magnets.

22. In a control for a source of power comprising a movable member having a plurality of recesses, a plurality of solenoids, and a plurality of magnets having wedge shaped portions adapted to be actuated by said solenoids and normally being attracted to said movable member, a valve movable with each of said magnets, said magnets being disposed relative to said recesses so that each magnet is adapted to impart a predetermined movement to said movable member when actuated by its solenoid, said predetermined movement being effective to cause said movable member to block effective movement of one of said magnets and to render another of said magnets operable when actuated by its solenoid to move said movable member, and means interconnecting said magnets so that when any one of said solenoids is actuated, the polarity of said magnets is reversed, whereby said movable member is repellant to said magnets.

23. In a control for a source of power comprising a movable member having a plurality of recesses, valve means carried by said movable member, a plurality of solenoids, and a plurality of magnets having wedge shaped portions adapted to be actuated by said solenoids and normally being attracted to said movable member, a valve movable with each of said magnets, said magnets being disposed relative to said recesses so that each magnet is adapted to impart a predetermined movement to said movable member when actuated by its solenoid, said predetermined movement being effective to cause said movable member to block effective movement of one of said magnets and to render another of said magnets operable when actuated by its solenoid to move said movable member, and means interconnecting said magnets so that when any one of said solenoids is actuated, the polarity of said magnets is reversed, whereby said movable member is repellant to said magnets.

24. In a control for a source of power, a plurality of magnetic members, a movable member normally attractive to said magnetic members, electromagnetic means to actuate said magnetic members, said magnetic means and said movable means being formed to coact, and said electromagnetic means being adapted to effect actuation of said magnet members in predetermined order and to render said movable member and said magnetic members mutually repellant.

25. A control for a source of power comprising a plurality of solenoids, a control member to be actuated by each of said solenoids to an operative position, a circuit to each of said solenoids, and means to close said circuits to said solenoids so that when one circuit is closed, the other circuits will be opened and magnetic means to hold an actuated member in an operative position when the circuit to its solenoid is broken and until another circuit is closed.

26. A control for a source of power comprising a plurality of solenoids, a control member to be actuated by each of said solenoids to an operative position, a circuit to each of said solenoids, and means to close said circuits to said solenoids so that when one circuit is closed, the other circuits will be opened and magnetic means to hold an actuated member in an operative position when the circuit to its solenoid is broken and until another circuit is closed, said magnetic means being inoperative when a circuit is closed.

27. In a change speed device for use with a prime mover, a drive member, a driven member, means to connect said members at different ratios, said means including engaging means, fluid pressure operated means to effect engagement of said engaging means, a source of fluid pressure, and a pair of valves in control of said source, one of said valves being a pressure regulating valve, electrically controlled means to open said other valve and means responsive to the speed of said prime mover to actuate said pressure regulating valve in proportion to the engine speed and to control said electrically controlled means at desired speeds.

28. In a change speed device, a drive member, a driven member, means to connect said members at different ratios and speed responsive means in control of said connecting means, said speed responsive means comprising a slidable member having internal cam portions, a rotatable head, thrustor arms pivotally carried by said head in contact with said portions, and said cam portions being disposed relative to the path of movement of said arms on rotation of said head so that said arms become relatively less effective as the speed of rotation of said head increases whereby said arms effect a movement of said member in substantially direct relation to the speed of rotation of said head.

29. In a change speed device, a drive member, a driven member, means to connect said members at different ratios, said means including an ineffective coupling including an independently rotatable reactor and means to hold said reactor against rotation to render said coupling effective, a second normally ineffective coupling between said first reactor and one of said members, said second coupling comprising an idler gear carried by said first reactor, a second independently rotatable reactor adapted to be rotated by said idler gear and means to hold said second reactor against rotation to render said second coupling effective.

30. In a change speed device, a drive member, a driven member, means to connect said members at different ratios, said means including a first normally ineffective coupling between said members, said coupling including an independently rotatable reactor and means to hold said reactor against rotation to render said coupling effective, a second normally ineffective coupling between said first reactor and one of said members, said second coupling including step gears carried by said first reactor, an independently rotatable reactor in mesh with each portion of said step gears and means to control each of said reactor members to render said coupling variably effective.

31. The device of claim 30 in which one of said reactors in said second coupling is an externally toothed reactor in mesh with a portion of said step gears to establish when restrained a reverse drive of said member.

32. In a change speed device, a drive shaft, a driven shaft, a gear on one of said shafts, idler gears carried by the other of said shafts in mesh with said first named gear, a reactor rotatable independently of said shafts and driven by said idler gears, a second reactor rotatable independently of said shafts, and idler gears carried by said second reactor to rotate said other shaft, said last named idler gears being driven by said first reactor.

33. In a change speed device, a casing, a drive shaft and a driven shaft, hydraulically operable means within said casing to variably couple said shafts, said means including a rotatable member, a source of hydraulic fluid forwardly and exteriorly of said casing, and valve controlled means to deliver fluid from said source into said casing to lubricate and actuate said coupling means, said source being so disposed relative to said casing to preclude the return of said fluid to its source by gravity without excessive accumulation of said fluid within said casing, means to regulate the level of accumulated fluid, said regulating means including collecting means carried by said casing relative to said source to ensure the return of fluid to said source and a return conduit in communication with said source to said collecting means, said fluid being elevated to said collecting means by said rotatable member.

34. The device of claim 33 in which the collecting means is a trough carried by said casing in parallel with said shafts.

35. In a change speed device, a drive shaft, a driven shaft, a reactor rotatable independently of said shafts, means to couple said reactor to one of said shafts, an idler step gear carried by said reactor and connecting said shafts, a second reactor rotatable independently of said shafts, an idler gear carried by said second reactor and connecting said first named reactor and one of said shafts, and means to hold each of said reactors against rotation.

36. In a change speed device, a drive shaft, a driven shaft, a gear on said driven shaft, a reaction member rotatable independently of said shafts, a step gear carried by said reactor member with one of its steps in mesh with said driven shaft gear, an externally toothed member rotatable independently of said shafts in mesh with the other step of said step gear, means connected with said drive shaft to rotate said reaction member, and means to hold said externally toothed member against rotation to cause said step gear to rotate said driven shaft counter to the rotation of said drive shaft.

37. In a change speed device, a drive shaft, a driven shaft, a gear on each of said shafts, idler gears carried by said driven shaft in mesh with said drive shaft gear to establish a normally ineffective coupling, a reactor rotatable by said idler gears independently of said shafts, means to hold said reactor against rotation, means to control the reactive rotation of said reactor member when unrestrained, and means to render said first named means operative.

38. In a change speed device, a drive shaft, a driven shaft, a gear on each of said shafts, idler gears carried by said driven shaft in mesh with said drive shaft gear to establish a normally ineffective coupling, a reactor rotatable by said idler gears independently of said shafts, means to hold said reactor against rotation, means to contol the reactive rotation of said reactor member when unrestrained, said means comprising a second reactor, and means to hold said second reactor against rotation to render said means effective, and idler gears carried by one of said reactors in mesh with the other of said reactors and said driven shaft gear.

39. A drive member, a driven member, means to vary the ratio between said members, means to actuate said first-named means, said actuating means including a slidable member, a head carried by said slidable member, said head having an internally cam-shaped surface, and speed responsive thrust or arms to coact with said surface at a varying angularity dependent on the position of said slidable member.

40. In a hydraulically operated ratio changer for a prime mover having a source of lubricating fluid under pressure, a drive shaft rotated by said prime mover, a driven shaft, a casing, means within said casing to connect said shafts at different ratios, means to actuate said connecting means, said actuating means including pressure operable devices within said casing, valve controlled means to deliver fluid under pressure from said source to said devices, a fluid return conduit from the upper part of said casing in communication with said source, the upper part of said casing being above said source, and fluid collecting means in the upper part of said casing in communication with said return conduit, any fluid leakage from said devices being positively elevated to said collecting means by said connecting means.

JESSE W. HALE.